United States Patent
Zhang et al.

(10) Patent No.: US 11,070,955 B2
(45) Date of Patent: Jul. 20, 2021

(54) UPDATE OF SECURITY FOR GROUP BASED FEATURE IN M2M

(71) Applicant: NEC Corporation, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/560,348

(22) Filed: Sep. 4, 2019

(65) Prior Publication Data

US 2019/0394201 A1 Dec. 26, 2019

Related U.S. Application Data

(63) Continuation of application No. 15/370,782, filed on Dec. 6, 2016, now abandoned, which is a continuation
(Continued)

(30) Foreign Application Priority Data

Jun. 29, 2012 (JP) .................................. 2012-147983

(51) Int. Cl.
*H04L 29/06* (2006.01)
*H04W 4/08* (2009.01)
(Continued)

(52) U.S. Cl.
CPC .............. *H04W 4/08* (2013.01); *H04L 63/10* (2013.01); *H04L 67/10* (2013.01); *H04W 4/70* (2018.02);
(Continued)

(58) Field of Classification Search
CPC ....... H04L 63/10; H04L 63/104; H04L 67/10; H04W 4/005; H04W 4/08; H04W 12/08
See application file for complete search history.

(56) References Cited

U.S. PATENT DOCUMENTS 6,606,706 B1 * 8/2003 Li ........................... H04L 12/18
713/153
6,684,331 B1 * 1/2004 Srivastava ............ H04L 9/0836
713/163

(Continued)

FOREIGN PATENT DOCUMENTS

CN 101690126 A 3/2010
CN 102036242 A 4/2011
(Continued)

OTHER PUBLICATIONS

China Notification of First Office Action issued in Chinese Patent Application No. 201711098437.3, dated Nov. 21, 2019, 17 pages.
(Continued)

*Primary Examiner* — Vance M Little

(57) ABSTRACT

A network node (21), which is placed within a core network, receives a message from a transmission source (30) placed outside the core network. The message includes an indicator indicating whether or not the message is addressed to a group of one or more MTC devices attached to the core network. The network node (21) determines to authorize the transmission source (30), when the indicator indicates that the message is addressed to the group. Further, the message includes an ID for identifying whether or not the message is addressed to the group. The MTC device determines to discard the message, when the ID does not coincide with an ID allocated for the MTC device itself. Furthermore, the MTC device communicates with the transmission source (30) by use of a pair of group keys shared therewith.

18 Claims, 5 Drawing Sheets

Related U.S. Application Data of application No. 14/409,646, filed as application No. PCT/JP2013/002661 on Apr. 19, 2013, now abandoned.

(51) Int. Cl.

| | | |
|---|---|---|
| *H04W 12/08* | (2021.01) | |
| *H04W 4/70* | (2018.01) | |
| *H04W 12/086* | (2021.01) | |
| *H04L 29/08* | (2006.01) | |

(52) U.S. Cl.
CPC ......... *H04W 12/08* (2013.01); *H04W 12/086* (2021.01); *H04L 63/104* (2013.01)

(56) References Cited

U.S. PATENT DOCUMENTS

| | | | | |
|---|---|---|---|---|
| 7,813,510 | B2* | 10/2010 | Fu | H04L 9/0822 380/279 |
| 8,458,462 | B1* | 6/2013 | Hanna | H04L 63/10 713/163 |
| 8,971,535 | B2* | 3/2015 | Reilly | H04L 9/0894 380/277 |
| 10,587,551 | B1* | 3/2020 | Acton | H04L 63/10 |
| 2002/0037736 | A1* | 3/2002 | Kawaguchi | H04W 4/08 455/518 |
| 2004/0029596 | A1 | 2/2004 | Kim et al. | |
| 2005/0050004 | A1* | 3/2005 | Sheu | H04L 63/065 |
| 2007/0143600 | A1* | 6/2007 | Kellil | H04L 63/065 713/163 |
| 2007/0162968 | A1 | 7/2007 | Ferreira et al. | |
| 2008/0013733 | A1* | 1/2008 | Johansson | H04L 9/3247 380/278 |
| 2009/0290522 | A1* | 11/2009 | Zhou | H04W 4/08 370/312 |
| 2010/0325732 | A1* | 12/2010 | Mittal | H04L 63/065 726/26 |
| 2010/0329463 | A1* | 12/2010 | Ratliff | H04L 9/0833 380/279 |
| 2011/0058673 | A1* | 3/2011 | Zheng | H04L 9/0833 380/255 |
| 2011/0134841 | A1 | 6/2011 | Shaheen | |
| 2011/0201365 | A1 | 8/2011 | Segura | |
| 2011/0243261 | A1 | 10/2011 | Bienas et al. | |
| 2011/0307694 | A1 | 12/2011 | Broustis et al. | |
| 2012/0064932 | A1 | 3/2012 | Lim et al. | |
| 2012/0148050 | A1* | 6/2012 | Lewis | H04L 65/4061 380/278 |
| 2014/0093082 | A1* | 4/2014 | Jung | H04L 9/0891 380/270 |

FOREIGN PATENT DOCUMENTS

| | | |
|---|---|---|
| WO | WO-2011/087826 A1 | 7/2011 |
| WO | WO-2012/018130 A1 | 2/2012 |
| WO | WO-2012/064932 A1 | 5/2012 |

OTHER PUBLICATIONS

3GPP TR 23.888 V1.6.1, "System Improvements for Machine-Type Communications," Release 11, Feb. 2012 (165 pages).
3GPP TR 23.8xy V0.1.0, "Machine-Type and other Mobile Data Applications Communications Enhancements," (Release 12), May 2012, (15 pages).
3GPP TR 33.868 V0.8.0, "Security Aspects of Machine-Type Communications," (Release11), May 2012, (48 pages).
3GPP TS 23.682 V11.1.0, "Architecture Enhancements to Facilitate Communications with Packet Data Networks and Applications," (Release 11), Jun. 2012, (27 pages).
International Search Report corresponding to PCT/JP2013/002661, dated Nov. 14, 2013 (6 pages).
Japanese Notification of Reasons for Refusal corresponding to Japanese Application No. 2014-560976, dated Dec. 15, 2015, 8 pages.
Juniper Networks "Solution for Group Based Charging/policing/addressing", SA WG2 Meeting #91, S2-122305, May 21-25, 2012, Kyoto, Japan, 6 pages.
KPN, KDDI, Acision, Sierra Wireless, Huawei, Hisilicon "Merge Proposal Group Based Key Issue Contributions", SA WG2 Meeting #91, S2-122610, May 21-25, 2012, Kyoto, Japan, 5 pages.
China Notification for Patent Registration Formalities issued in Chinese Patent Application No. 201711098437.3, dated Sep. 4, 2020, 4 pages.
Song Wang "Research on Security of 3GPP IMS Network" A dissertation for Master's Degree, University of Science and Technology of China, May 10, 2009, pp. 1-87 (98 pages).

* cited by examiner

UPDATE OF SECURITY FOR GROUP BASED FEATURE IN M2M

CROSS-REFERENCE TO RELATED APPLICATIONS

This application is a continuation of U.S. patent application Ser. No. 15/370,782 entitled "Update of Security for Group Based Feature in M2M", filed on Dec. 6, 2016, which is a continuation of U.S. patent application Ser. No. 14/409, 646 entitled "Update of Security for Group Based Feature in M2M", filed on Dec. 19, 2014, which is a national stage application of International Application No. PCT/JP2013/002661 filed on Apr. 19, 2013, which claims the benefit of the priority of Japanese Patent Application No. 2012-147983, filed on Jun. 29, 2012, the disclosures of each of which are hereby incorporated by reference in their entirety.

TECHNICAL FIELD

The present invention relates to a security solution for group based Machine-Type Communication (MTC) with the architecture newly provided in NPL 1. The solution can support MTC-IWF (MTC-Interworking Function) to perform proper authorization to SCS (Services Capability Server) when a group message is sent from it.

The present invention also relates to a mechanism to deliver and broadcast the group message securely.

BACKGROUND ART

Study of group based feature is initiated in 3GPP for release 12 (see e.g. NPL 2), and new architecture has been studied in NPL 1. With the concept of group gateway (GW) that the inventors of this application proposed in PTL 1, this invention extends it in the new architecture.

SCS sends group message to network node of MTC-IWF and MTC-IWF will forward the group message to the target group of MTC devices. The message is targeted to more than one MTC devices and may trigger these devices to communicate with network.

CITATION LIST

Patent Literature

PTL 1: International Patent Publication No. WO 2012/018130

Non Patent Literature

NFL 1: 3GPP TS 23.682, "Architecture enhancements to facilitate communications with packet data networks and applications (Release 11)", v11.1.0, 2012-06
NPL 2: 3GPP TR 23.8xy, "Machine-Type and other Mobile Data Applications Communications Enhancements; (Release 12)", V0.1.0, 2012-05
NPL 3: 3GPP TR 33.868 "Security aspects of Machine-Type Communications; (Release 11)", v0.8.0

SUMMARY OF INVENTION

Technical Problem

However, the inventors of this application have found a problem that a fraud group message can cause DoS (Denial of Service) attack to the network. Note that the attacks to MTC device described in NPL 3 also valid here.

Thus MTC-IWF should perform SCS authorization to see if it can send a group message, especially when the message contains trigger.

Solution to Problem

In order to solve the above-mentioned problems, a network node according to first exemplary aspect of the present invention is placed within a core network. This network node includes a reception means for receiving a message from a transmission source placed outside the core network, the message including an indicator indicating whether or not the message is addressed to a group of one or more MTC devices attached to the core network; and a determination means for determining to authorize the transmission source, when the indicator indicates that the message is addressed to the group.

Further, a method according to second exemplary aspect of the present invention provides a method of controlling a network node that is placed within a core network. This method includes receiving a message from a transmission source placed outside the core network, the message including an indicator indicating whether or not the message is addressed to a group of one or more MTC devices attached to the core network; and determining to authorize the transmission source, when the indicator indicates that the message is addressed to the group.

Further, a MTC device according to third exemplary aspect of the present invention includes a reception means for receiving a message from the core network, the message including an ID (identifier) for identifying whether or not the message is addressed to a group of one or more MTC devices; and a determination means for determining to discard the message, when the ID does not coincide with an ID allocated for the MTC device itself.

Further, a method according to fourth exemplary aspect of the present invention provides a method of controlling a MTC device attached to a core network. This method includes receiving a message from the core network, the message including an ID for identifying whether or not the message is addressed to a group of one or more MTC devices; and determining to discard the message, when the ID does not coincide with an ID allocated for the MTC device itself.

Further, a gateway according to fifth exemplary aspect of the present invention relays a message from a transmission source of the message placed outside a core network to a group of one or more MTC devices attached to the core network. This gateway includes an acquisition means for acquiring a pair of group keys for the group of MTC devices to securely conduct communication with the transmission source; and a relaying means for relaying the message by use of the group keys.

Further, a MTC device according to sixth exemplary aspect of the present invention includes an acquisition means for acquire a pair of group keys for securely conducting communication with a transmission source that is placed outside the core network and transmits a message addressed to a group of one or more MTC devices; and a communication means for communicate with the transmission source by use of the group keys.

Further, a method according to seventh exemplary aspect of the present invention provides a method of controlling gateway that relays a message from a transmission source of the message placed outside a core network to a group of one or more MTC devices attached to the core network. This method includes acquiring a pair of group keys for the group of MTC devices to securely conduct communication with the transmission source; and relaying the message by use of the group keys.

Furthermore, a method according to eighth exemplary aspect of the present invention provides a method of controlling a MTC (Machine-Type-Communication) device attached to a core network. This method includes acquiring a pair of group keys for securely conducting communication with a transmission source that is placed outside the core network and transmits a message addressed to a group of one or more MTC devices; and communicating with the transmission source by use of the group keys.

Advantageous Effects of Invention

According to the present invention, it is possible to perform SCS authorization to see if it can send a group message, especially when the message contains trigger.

DESCRIPTION OF EMBODIMENTS

1. Discussion

Figure 1:
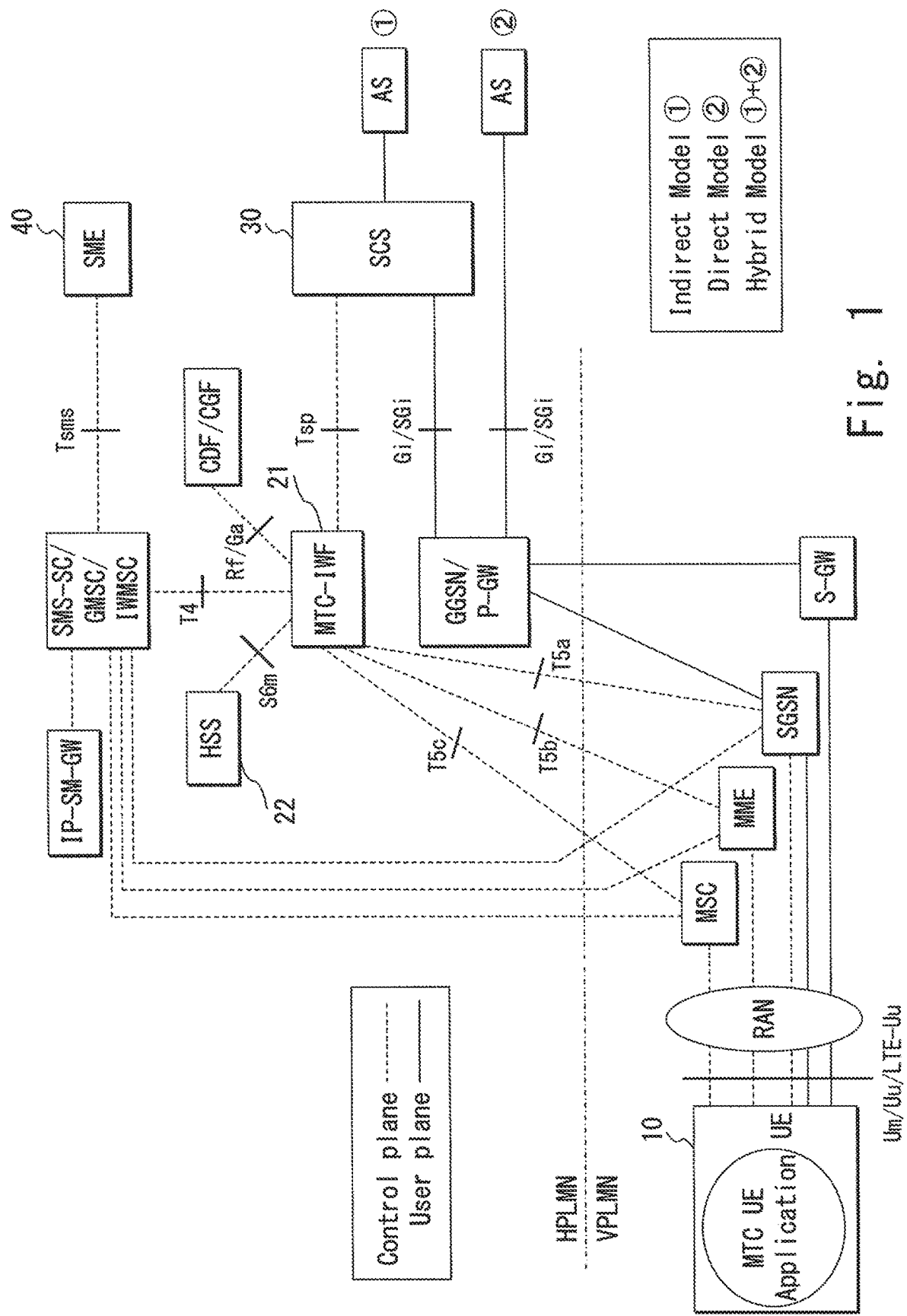
FIG. 1 is a block diagram showing an example of system architecture according to an exemplary embodiment of the present invention.

SA2 has started study on group based feature in TR 23.8xy v0.1.0 "Machine-Type and other Mobile Data Applications Communications Enhancements (Release 12)". SA3 should study security issue for release 12 according to the architectural requirements that SA2 provided.

The architectural requirements for group based messaging from SA2 are given below:
The network shall provide a mechanism to distribute a group message from an SCS to those members of an MTC group located in a particular geographic area.
The group based messaging feature shall not require additional new functionality for UEs that do not use this feature.
The system shall support a mechanism where a UE that uses the group based messaging feature can efficiently recognize distributed group messages addressed to the UE.
The system shall provide an interface for the SCS to send a group message. This interface shall be able to carry the following information:
the application layer content of the group message,
the group identification for which the group message is intended, and
the geographical area and RAT(s) in which the group message shall be distributed.
The system shall be protected against overload resulting from devices responding to the distributed group message.
Group based messaging shall be supported in GERAN, UTRAN, and E-UTRAN access.

According to the current architecture, one can assume that MTC-IWF receives a group message from SCS and forwards it to the target group of MTC devices.

With a group message multiple MTC devices can be triggered to respond. Therefore an unauthorized group message may cause much more severe problem compared to what a trigger to a single MTC device can cause. Other threats like MitM attack and replay attack which were considered for non-group message also apply here with amplified effect. Therefore
Network should perform authorization of whether the SCS can send group message to the target group. To do that. MTC-IWF should be able to distinguish the group message from other messages.
The group message should have confidentiality and integrity protection and MTC devices which receive the message should be able to verify it.
Network should provide a means for SCS, which is located outside of 3GPP network, to communicate with the target group. The group identification is used when SCS sends the group message.
Similar with the UE identification, the group identification used in 3GPP network should not be sent over an external interface, and not be known by a node outside of 3GPP network. This applies for a SCS which is located outside of 3GPP network.

With the above analysis, the security requirements for MTC group based feature are concluded as below:
MTC-IWF should verify if the SCS is authorized to send group message to a given MTC group.
MTC-IWF should be able to distinguish group (trigger) message from other messages.
Group message that are distributed to the group of MTC devices should have confidentiality, integrity protection and replay protection.
MTC device which receives the group message should be able to verify if the group message is sent from an authorized SCS.
Group ID should not to be exposed to a node that is located outside of 3GPP network. This includes the SCS which is outside of 3GPP network as well.

2. Proposal

We propose SA3 to
1) Study the threats and security requirements for group based feature
2) Include the analysis and security requirements above in TR 33.868 for release 12, given in a separate pCR as follows.
5.x Key Issue—Group Based Messaging
5.x.1 Issue Details
SA2 has started study for group based feature in TR 23.8xy (release 12). According to the current architecture, one can assume that MTC-IWF receives a group message from SCS and forwards it to the target group of MTC devices.
5.x.2 Threats
With a group message multiple MTC devices can be triggered to respond. Therefore an unauthorized group message may cause much more severe problem compared to what a trigger to a single MTC device can cause. Other threats like MitM attack and replay attack which were considered for non-group message also apply here with amplified effect.

5.x.3 Security Requirements

MTC-IWF should verify if the SCS is authorized to send group message to a given MTC group.

MTC-IWF should be able to distinguish group (trigger) message from other messages.

Group message that are distributed to the group of MTC devices should have confidentiality, integrity protection and replay protection.

MTC device which receives the group message should be able to verify if the group message is sent from an authorized SCS.

Group ID should not to be exposed to a node that is located outside of 3GPP network. This includes the SCS which is outside of 3GPP network as well.

Hereinafter, an exemplary embodiment of the present invention will be described with reference to FIGS. 1 to 5.

As shown in FIG. 1, a system according to this exemplary embodiment includes a core network (3GPP network), a plurality of MTC devices 10 which connect to the core network through a RAN (Radio Access Network), and an SCS 30 and an SME (Short Message Entity) 40 which serve as group message or group trigger sources placed outside the core network. Note that the RAN is formed by a plurality of base stations (i.e., eNBs (evolved Node Bs)).

Among them, each MTC device 10 is a UE for MTC connecting to the core network via the Um/Uu/LTE-Uu interface. The UE can host one or multiple MTC Applications. The corresponding MTC Applications in the external network are hosted on one or multiple ASs (Application Servers).

Further, the SCS 30 and the SME 40 connect to the core network to communicate with the MTC devices 10.

Furthermore, the core network includes an MTC-IWF 21 and an HSS (Home Subscriber Server) 22 in the HPLMN (Home Public Land Mobile Network). In the core network, the MTC-IWF 21 serves as a network node which receives a group message or group trigger from its transmission source. Typically, the MTC-IWF 21 receives a group message which can be also be a group trigger from the SCS 30 via Tsp interface or from the SME 40 via T4 and Tsms interfaces, and forwards the group message to the MME (Mobility Management Entity). SGSN (Serving GPRS (General Packet Radio Service) Support Node) or MSC (Mobile Switching Centre), which serves as a network element forwarding the group message to the MTC device 10, via T5b/T5a/T5c interface, so that the group message or group trigger can be routed to the MTC device 10. The HSS 22 or the MTC-IWF 21 can create and stores a mapping of an internal and external group IDs, and the HSS 22 generates a pair of group keys (which will be described later). One of the group keys is generated for encryption and decryption, another one is generated for integrity protection.

Figure 2:
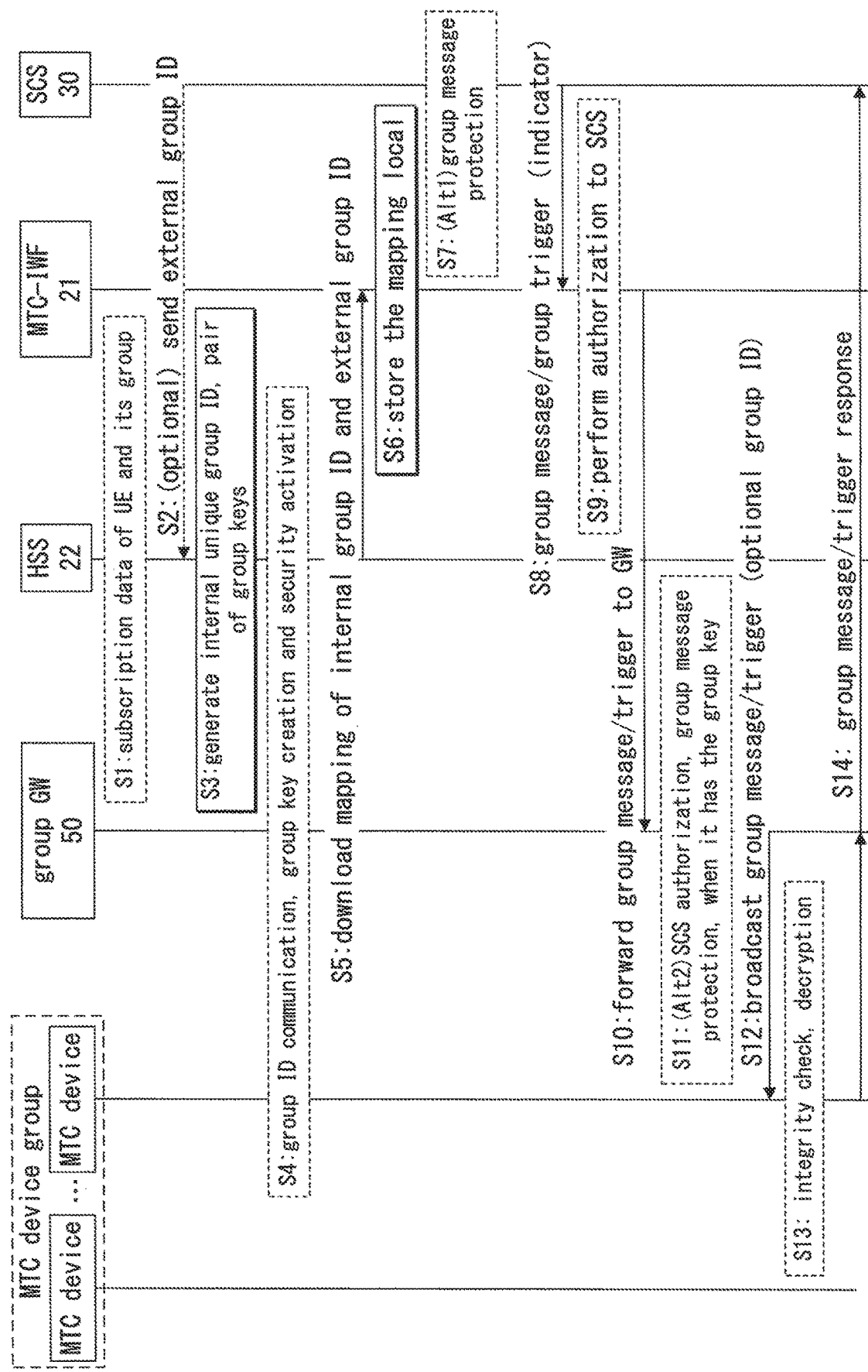
FIG. 2 is a sequence diagram showing an example of group message terminated at MTC device in a system according to the exemplary embodiment of the present invention.

Next, operation examples of this exemplary embodiment will be described in detail with reference to FIG. 2. FIG. 2 shows the message sequence of group message sending to a group of MTC devices. There are more than one device in the MTC device group.

In this exemplary embodiment, assume that mutual authentication has been performed between group GW (which will be described later) and network and group GW and MTC devices 10. Note that a gateway was proposed in a separate invention of PTL 1 which is responsible of receiving group message and send it to MTC devices, and send concatenated messages for MTC device communicating with network or SCS. This exemplary embodiment proposes some new functions for the gateway and it can be either deployed in a network node or be an independent node.

(1) Group Message Sending and Receiving (A) SCS 30 sends a group message over Tsp interface to MTC-IWF 21 (Step S8). The group message contains group ID and geography area information (this is described in NPL 2). In addition, the message includes an indicator indicating whether the message is a group message or a non-group message. Therefore, the MTC-IWF 21 can distinguish the group message from the non-group message, thereby being able to perform a proper authorization to the SCS 30 as described at the following (B). Further, the indicator may indicate whether or not the group message contains trigger. In this case, the MTC-IWF 21 can also distinguish the group trigger from the group message or the non-group message.

(B) MTC-IWF 21 performs authorization to SCS 30, to see if it can send group message to the target group (Step S9). This should be the same authorization procedure when MTC-IWF 21 sends a non-group message. The authorization is based on the group information of group ID, geography area information received from SCS 30 and authorization data retrieved by MTC-IWF 21 from HSS 22.

(C) MTC-IWF 21 forwards the group message to a group GW 50 (Step S10). The group GW 50 can own more than one group. It can be a virtual function that deployed on any network node like eNB/MME/MTC-IWF, or an independent node.

(D) The group GW 50 broadcasts the group message to the target group of MTC devices (Step S12). In the case where the group GW 50 is deployed on the eNB, the group message is broadcast only between the eNB and the MTC devices. Therefore, it is possible to avoid congestion of the core network. On the other hand, in the case where the group GW 50 is deployed on the MME which serves as one of network elements connected to one or more base stations, it is possible to broadcast the group message over a plurality of areas while partly reducing the congestion of the core network.

(2) Group ID, Group Key Management and Group Message Security

HSS 22 generates a unique group ID for the group of MTC devices (Steps S1 and S3). At Step S3, the HSS 22 can generate the group keys. For the SCS 30 which is located outside of the core network (3GPP network domain), the group ID should not be exposed to SCS 30 thus HSS 22 will have a mapping of the group IDs and external use group IDs. Internal use Group ID can be sent to MTC devices 10, group GW 50 within the existing NAS or AS messages (Step S4).

There can be two ways of generating an external group ID. It can be created by HSS 22 and provided to SCS 30. Alternatively it can be created by SCS 30 and provided to HSS 22 (Step S2). Either way, HSS will create the mapping of both group IDs.

The MTC-IWF 21 downloads the mapping from the HSS 22 (Step S5), and stores it locally (Step S6). Further, upon forwarding the group message to the group GW 50 at the above-mentioned Step S10, the MTC-IWF 21 refers to the mapping, thereby mapping the external group ID to the corresponding internal group ID in the group message.

Thus, in this exemplary embodiment, the internal group ID shall be hidden from outside the core network. Therefore, it is possible to prevent a fraud group message from causing attack to the core network. Further, the external group ID is made effective only after the source authorization. Therefore, even if the external group ID is revealed to attackers, it is possible to prevent attack.

Security is needed when a group message is broadcasted to the group of MTC devices. This exemplary embodiment proposes to use a pair of group keys for the group message confidentiality and integrity protection.

After MTC devices and group GW are mutually authenticated with network, the group key management and security activation should be performed (Step S4). The group key is for all the MTC devices in a MTC group to have group key. This group key is the same for all the MTC devices in the group, and it is shared by them with group GW 50 and optionally with the other end where the group message is sent.

There are few options of which network node can have the same group key and how the group message is sent:

(A) MTC Device—Group GW

The group message transferring between group GW 50 and SCS 30 can be protected by IPsec or other existing network security solution. Group GW 50 uses the group key to protect the group message and broadcasts it to the target group MTC devices. At Step S4, the MTC devices and the group GW 50 acquire the group keys from the HSS 22, so that the group keys are shared between the MTC devices and the group GW 50.

(B) MTC Device—SCS (Step S7)

In this case, group GW 50 will forward the group message and broadcast it as it is. On the other hand, the MTC devices acquire the group keys as with the above-mentioned (A). Further, after the authorization, the SCS 30 acquire the group keys from the HSS 22 through the MTC-IWF 21, so that the group keys are shared between the MTC devices and the SCS 30. Therefore, it is possible to provide end-to-end security between MTC devices and SCS 30. MTC device can perform authorization to SCS 30.

(C) MTC Device—Group GW SCS (Step S11)

In this case, the communication between group GW 50 and SCS 30 can be protected by the group key. Group GW 50 can perform authorization to SCS 30 with the group key and MTC device do not need to perform authorization. As with the above-mentioned (A) and (B), the group keys are shared between the MTC devices, the group GW 50 and the SCS 30. Further, the group GW verifies the group message (decryption and integrity check) with the shared group key, thereby discarding the group message upon failing the verification. In this case, it is possible to avoid the broadcasting itself.

(3) The Group Message that can be Broadcasted with or without Group ID

When the group ID is included in the group message, MTC device listens to the message but will only receive the message which contains the same group ID it has, then the MTC device will perform integrity check and decrypt the message with the shared group key (Steps S13 and S14). When the group ID does not coincide with the group ID allocated for the MTC device itself, the MTC device discards the group message. In this case, the MTC device does not need to verify the group message. Therefore, it is possible to reduce processing load on the MTC device.

On the other hand, when the group ID is not included, the MTC device will listen to all the broadcasts and perform integrity check and decryption and only respond to the ones it can verify.

Figure 3:
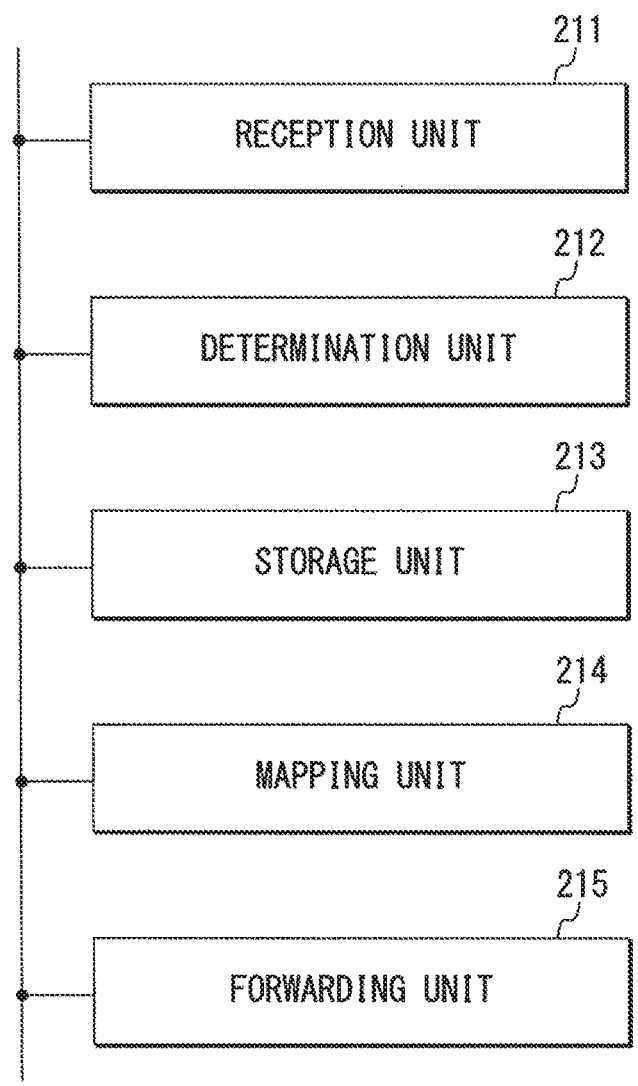
FIG. 3 is a block diagram showing a configuration example of a network node placed according to the exemplary embodiment of the present invention.

As shown in FIG. 3, the MTC-IWF 21 includes at least a reception unit 211 and a determination unit 212. The reception unit 211 receives from the SCS 30 or the SME 40 the group message or group trigger including the above-mentioned indicator. The determination unit 211 determines to authorize the SCS 30 or the SME 40, when the indicator indicates the group message or group trigger. In addition to these units 211 and 212, the MTC-IWF 21 can include a storage unit 213, a mapping unit 214, and a forwarding unit 215. The storage unit 213 stores the above-mentioned mapping. The mapping unit 214 maps the external group ID to the corresponding internal group ID in the group message or group trigger, by use of the mapping. The forwarding unit 215 forwards the group message or group trigger to one of the MME/SGSN/MSC, so that the group message or group trigger is broadcast to the MTC devices. Note that these units 211 to 215 are mutually connected with each other thorough a bus or the like.

These units 211 to 215 can be configured by, for example, transceivers which respectively conduct communication with the HSS 22, the MME/SGSN/MSC, the SCS 30 and the SME 40, and a controller which controls these transceivers to execute the processes shown at Steps S5, S6 and S8 to S10 in FIG. 2 or processes equivalent thereto.

Figure 4:
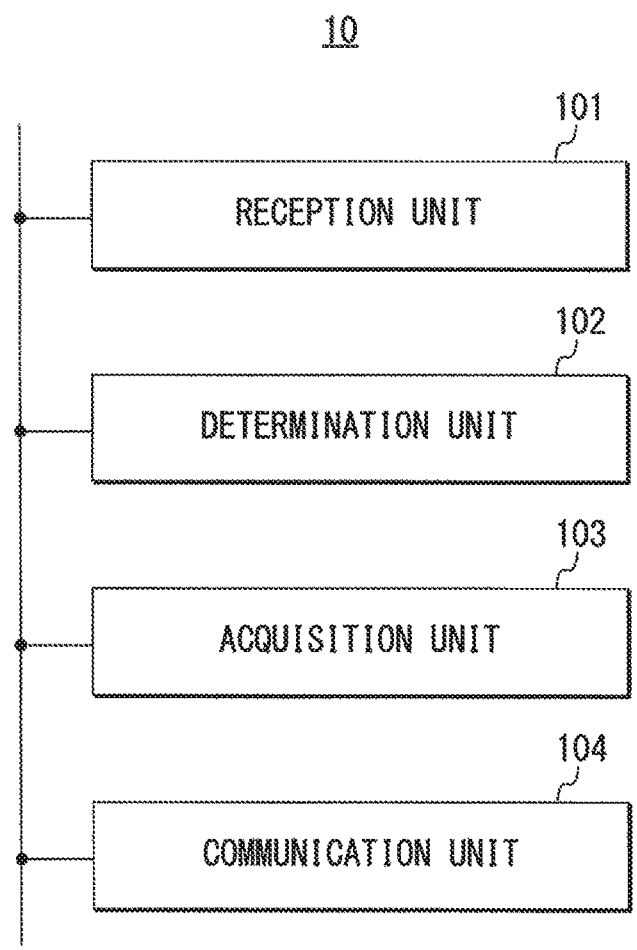
FIG. 4 is a block diagram showing a configuration example of a MTC device according to the exemplary embodiment of the present invention.

Further, as shown in FIG. 4, each of the MTC devices 10 includes at least a reception unit 101 and a determination unit 102. The reception unit 101 receives from the core network the group message or group trigger including the above-mentioned group ID. The determination unit 102 determines to discard the group message or group trigger, when the group ID does not coincides with a group ID for each of the MTC devices 10 itself. As substitutes for or in addition to these units 101 and 102, each of the MTC devices 10 can include an acquisition unit 103 and a communication unit 104. The acquisition unit 103 acquires the group keys from e.g. the HSS 20. The communication unit 104 communicates with the SCS 30 or the SME 40 by use of the group keys. Note that these units 101 to 104 are mutually connected with each other thorough a bus or the like.

These units 101 to 104 can be configured by, for example, a transceiver which wirelessly conducts communication with the core network through the RAN, and a controller which controls this transceiver to execute the processes shown at Steps S4 and S12 to S14 in FIG. 2 or processes equivalent thereto.

Figure 5:
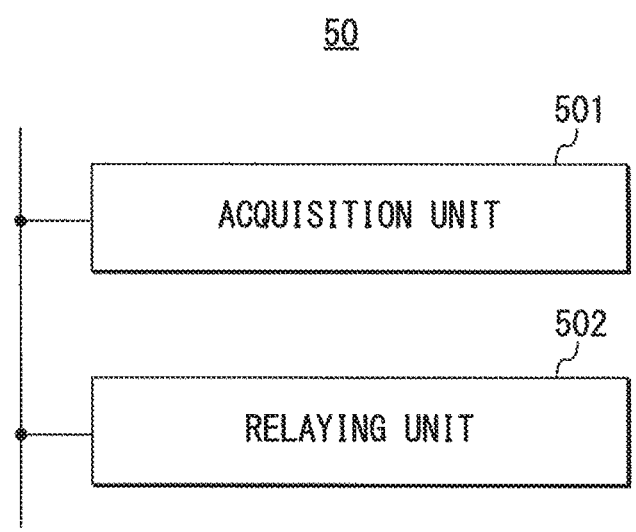
FIG. 5 is a block diagram showing a configuration example of a gateway according to the exemplary embodiment of the present invention.

Furthermore, as shown in FIG. 5, in the case of deploying the group GW 50 as an independent node, the group GW 50 includes at least an acquisition unit 501 and a relaying unit 502. The acquisition unit 501 acquires the group keys from e.g. the HSS 20. The relaying unit 502 relays the group message or group trigger by use of the group keys. Note that these units 501 and 502 are mutually connected with each other thorough a bus or the like.

These units 501 and 502 can be configured by, for example, transceivers which respectively conduct communication with the MTC-IWF 21, the HSS 22 and the MME/SGSN/MSC/RAN, and a controller which controls these transceivers to execute the processes shown at Steps S4 and S10 to S12 in FIG. 2 or processes equivalent thereto.

Although the illustration is omitted, each of the SCS 30 and the SME 40 includes, in addition to functions mounted on each of typical SCS and SME, at least one of a function of including the above-mentioned indicator in the group message or group trigger, a function of including the above-mentioned group ID in the group message or group trigger, and a function of communicating with the group of MTC devices by use of the above-mentioned group keys.

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

Supplementary Note 1

Network node such as HSS creates a unique internal use group ID for each group.

Supplementary Note 2

HSS sends the group ID to all the group member of MTC devices and the group GW. The group GW can be a function deployed in a network node or be an independent node.

Supplementary Note 3

External group ID and its mapping to the unique internal use group ID:
HSS keeps a mapping of the external group ID and unique group ID which is only used in the network. The external group ID can be either allocated by HSS or by SCS to which the group subscribes to.

Supplementary Note 4

MTC-IWF downloads the group ID mapping via interface Shin and stores it locally. Novelty is modification of the interface.

Supplementary Note 5

A pair of group keys for encryption and integrity protection is generated. The pair of group keys is the same for all the MTC devices within the group. Group GW and/or SCS can have the same group key.

Supplementary Note 6

Indicator in a group message such that network entities e.g. MTC-IWF can distinguish it from other non-group messages. An indicator for IWF to distinguish group trigger message from non-trigger group message. This helps MTC-IWF to perform proper authorization.

Supplementary Note 7

The group GW broadcasts the group message to the group of MTC devices, it is protected by a pair of group keys, such that only the proper MTC devices can receive and read the group message.

Supplementary Note 8

The group message can be broadcasted in one of the two ways shown below:
(A) Contains the group ID: MTC device will check the group ID in the broadcast, if it is the same with the group ID it holds, it will perform integrity check and decrypt the message with using the (group ID related) group key.
(B) Do not contain the group ID: MTC device just check all the broadcast messages with its group key.

This application is based upon and claims the benefit of priority from Japanese patent application No. 2012-147983, filed on Jun. 29, 2012, the disclosure of which is incorporated herein in its entirety by reference.

REFERENCE SIGNS LIST

10 MTC DEVICE
21 MTC-IWF
22 HSS
30 SCS
40 SME
50 GROUP GW
101, 211 RECEPTION UNIT
102, 212 DETERMINATION UNIT
103, 501 ACQUISITION UNIT
104 COMMUNICATION UNIT
213 STORAGE UNIT
214 MAPPING UNIT
215 FORWARDING UNIT
502 RELAYING UNIT

The invention claimed is:
1. A group communication system comprising:
a group of User Equipments (UEs);
a first network node for group management; and
a second network node for key management, wherein:
   the first network node is configured to acquire a group key from the second network node,
   the group of UEs is configured to acquire the group key from the second network node without going through the first network node,
   the first network node is configured to distribute, to the group of UEs, a group message encrypted by the group key, the group message including the group key and a group identifier (ID) for the group of UEs, and
   the group of UEs is configured to decrypt the group message using the group key and check the group ID.
2. The group communication system of claim 1, wherein the group key is the same for members of the group of UEs.
3. The group communication system of claim 1, wherein the group key is shared between the first network node and the group of UEs.
4. A method of a group communication system including a group of User Equipments (UEs), a first network node for group management, and a second network node for key management, the method comprising:
   acquiring, by the first network node, a group key from the second network node;
   acquiring, by the group of UEs, the group key from the second network node without going through the first network node;
   distributing, by the first network node to the group of UEs, a group message encrypted by the group key, the group message including the group key and a group identifier (ID) for the group of UEs;
   decrypting, by the group of UEs, the group message by using the group key; and
   checking, by the group of UEs, the group ID.
5. The method of claim 4, wherein the group key is the same for members of the group of UEs.
6. The method of claim 4, wherein the group key is shared between the first network node and the group of UEs.
7. A first network node in a group communication system including a group of User Equipments (UEs), and a second network node for key management, the first network node comprising:

a processor; and a memory having stored thereon a set of instructions executable by the processor, wherein the processor, upon execution of the instructions, causes the first network node to:

acquire a group key from the second network node, and distribute, to the group of UEs, a group message encrypted by the group key, the group message including the group key and a group identifier (ID) for the group of UEs, wherein the group of UEs acquires the group key from the second network node without going through the first network node, decrypts the group message using the group key, and checks the group ID.

8. The first network node of claim 7, wherein the group key is the same for members of the group of UEs.

9. The first network node of claim 7, wherein the group key is shared between the first network node and the group of UEs.

10. A method of a first network node in a group communication system including a group of User Equipments (UEs), and a second network node for key management, the method comprising:

acquiring a group key from the second network node; and distributing, to the group of UEs, a group message encrypted by the group key, the group message including the group key and a group identifier (ID) for the group of UEs, wherein the group of UEs acquires the group key from the second network node without going through the first network node, decrypts the group message using the group key, and checks the group ID.

11. The method of claim 10, wherein the group key is the same for members of the group of UEs.

12. The method of claim 10, wherein the group key is shared between the first network node and the group of UEs.

13. A User Equipment (UE) in a group communication system including a first network node for group management, and a second network node for key management, the UE comprising:

a processor; and a memory having stored thereon a set of instructions executable by the processor, wherein the processor, upon execution of the instructions, causes the UE to:

form a group of UEs with at least one other UE, acquire a group key from the second network node without going through the first network node, receive, from the first network node, a group message encrypted by the group key, the group message including the group key and a group identifier (ID) for the group of UEs, decrypt the group message using the group key, and check the group ID, wherein the first network node acquires the group key from the second network node.

14. The UE of claim 13, wherein the group key is the same for members of the group of UEs.

15. The UE of claim 13, wherein the group key is shared between the first network node and the group of UEs.

16. A method of a User Equipment (UE) in a group communication system including a first network node for group management, and a second network node for key management, the method comprising:

forming a group of UEs with at least one other UE;

acquiring a group key from the second network node without going through the first network node;

receiving, from the first network node, a group message encrypted by the group key, the group message including the group key and a group identifier (ID) for the group of UEs;

decrypting the group message using the group key; and checking the group ID, wherein the first network node acquires the group key from the second network node.

17. The method of claim 16, wherein the group key is the same for members of the group of UEs.

18. The method of claim 16, wherein the group key is shared between the first network node and the group of UEs.

* * * * *